Feb. 14, 1967 E. T. HILL ETAL 3,303,867
GOVERNORS
Filed Jan. 27, 1965 2 Sheets-Sheet 2
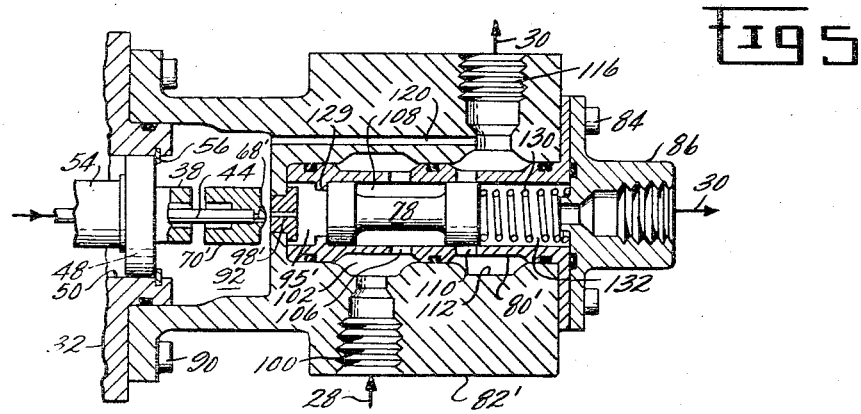
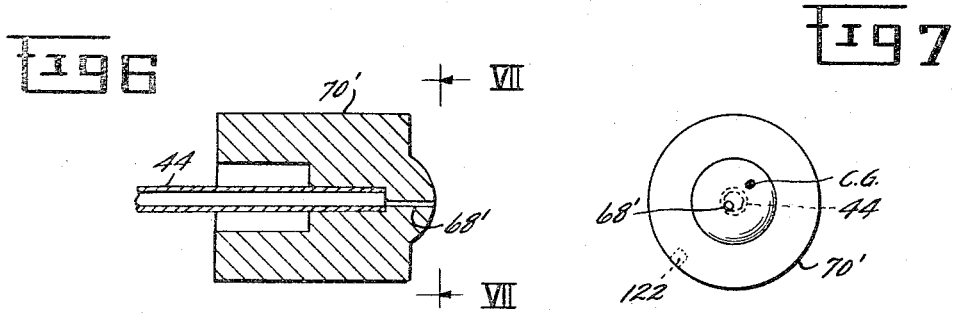
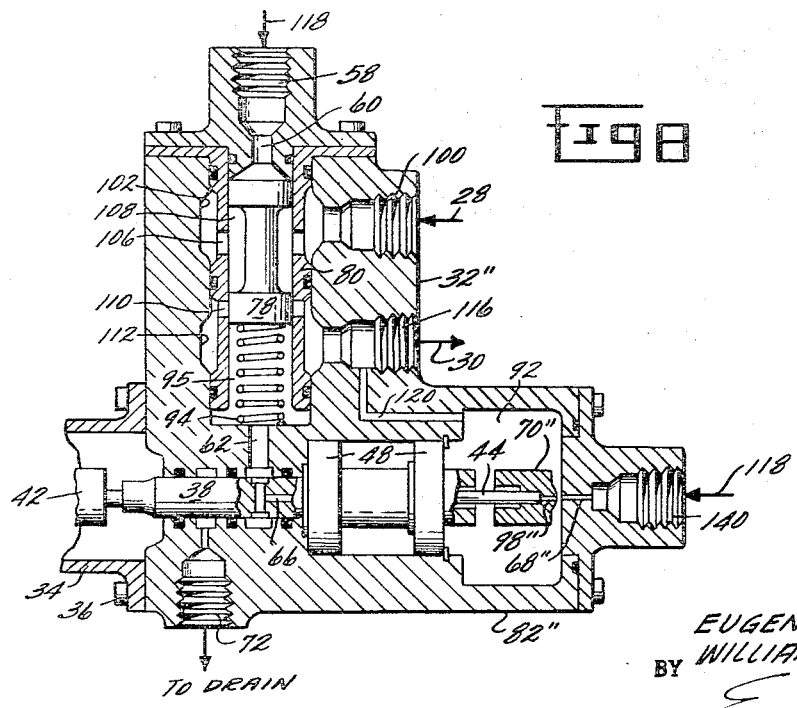
INVENTORS.
EUGENE T. HILL
WILLIAM R. SPENCER
BY
ATTORNEY

United States Patent Office 3,303,867
Patented Feb. 14, 1967

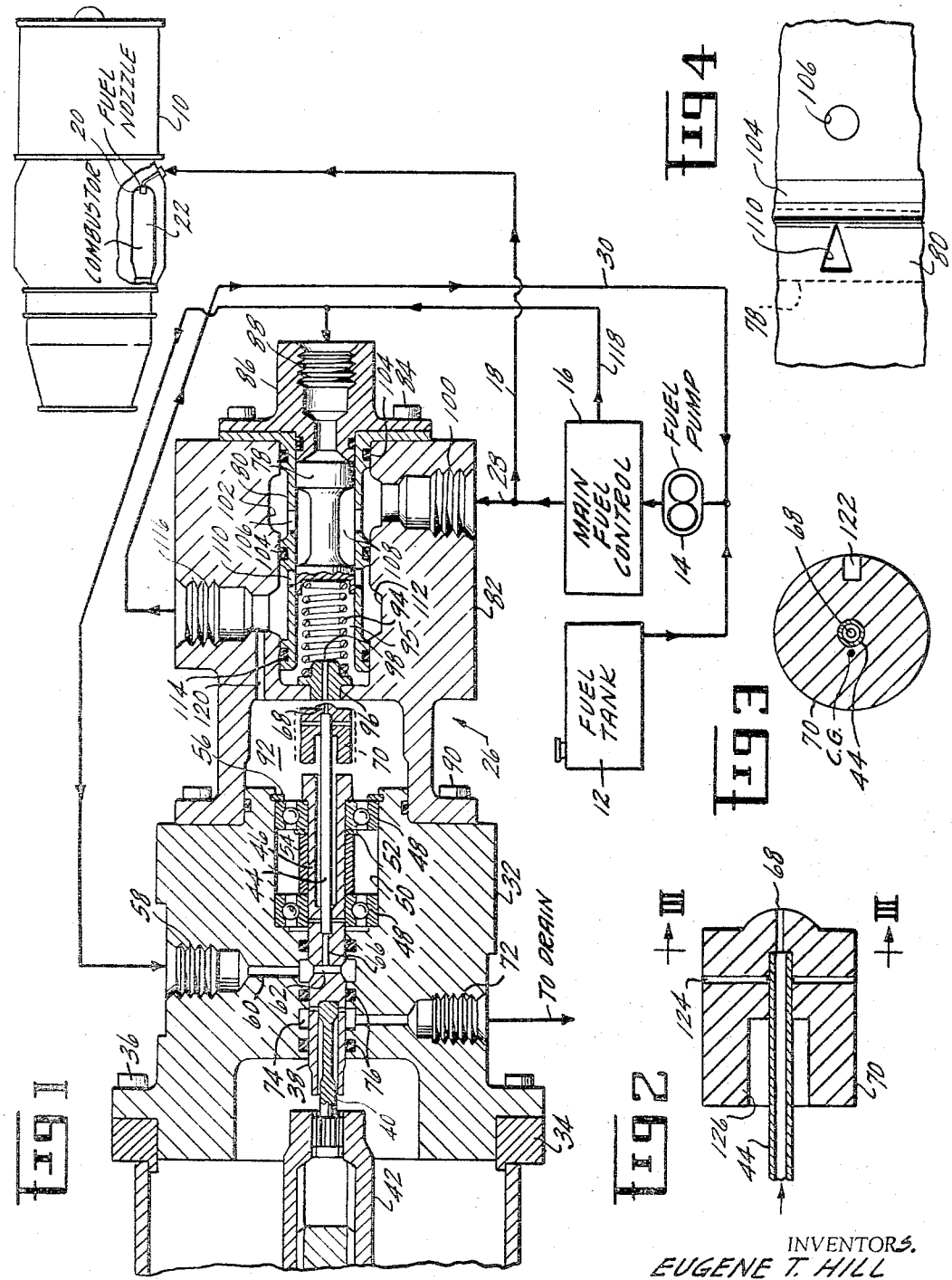

3,303,867
GOVERNORS
Eugene T. Hill, Hamilton, and William R. Spencer, Cincinnati, Ohio, assignors to General Electric Company, a corporation of New York
Filed Jan. 27, 1965, Ser. No. 428,317
17 Claims. (Cl. 158—36.4)

The present invention relates to improvements in engine control systems, and more particularly to improved governors for limiting the rate of operation of an engine.

A primary object of the present invention is to provide a governor which is particularly suited, though not necessarily limited, to the function of preventing sustained operation of a turbojet engine above its maximum design speed. This type of governor is commonly referred to as a topping governor, and normally functions independently of other speed control devices which might also fall within the general definition of governors.

During acceleration of a turbojet engine, it is a common practice to burn fuel at a maximum rate in order to obtain the necessary acceleration thrust. This rate of fuel combustion, however, is greater than that required to maintain the engine at its maximum design speed, once accelerated to that speed. Maximum design speed or 100% speed may be accurately established to give reasonable engine life at a point approaching the failure limits of various engine components. Thus, if 100% speed is exceeded to any substantial extent, or for any sustained length of time, the engine itself may actually fail, and if not, engine life will be drastically reduced. Topping governors operate within a very narrow speed range to prevent operation of the engine beyond 100% speed, and another object of the invention is to provide accurate and progressive speed control in this narrow range, as opposed to a simple On-Off or limit type of control.

A further object of the invention is to attain the above ends and at the same time reduce the weight of the governor mechanism for the obvious advantages in aircraft applications.

Yet another object of the invention is to attain these ends and further provide great accuracy and repeatability in the control of engine speeds.

In a broader sense, the object of the invention is to provide an engine control device which is of improved accuracy and repeatability and which is capable of giving sensitive regulation particularly over a narrow speed range.

In accordance wth these ends, the present invention is advantageously incorporated in a turbojet engine fuel control system and arranged to bypass flow of fuel intended for the combustor to thereby regulate the speed of operation of the engine. The governor comprises a shaft which is driven by the turbine shaft of the engine and is characterized by a cantilevered spring member disposed concentrically of the axis of said shaft. A relatively large weight is secured to the free end of this spring member and slightly unbalanced. The mass of this unbalanced weight times the square of the rotational speed is referred to as the "weight rate." This "weight rate," calculated at 100% engine speed, is slightly less than the spring rate of the cantilevered spring member. Preferably the ratio of spring rate (of the cantilevered member) to weight rate is between 1.25 and 1.1 to one. With these relationships, the free end of the spring member will remain substantially on the axis of the turbine driven shaft until it reaches 100% speed. Beyond this point, deflection of the free end of the spring member in a radial direction occurs at a very sharp or steep rate, but also at a progressive and predictable rate. Means responsive to this radial deflection of the spring are provided for reducing the amount of fuel fed to the combustor to thereby regulate the speed of engine operation.

In accordance with other features of the invention, the spring member is in the form of a tube with means being provided to discharge pressurized fluid from its free end. The tube is unbalanced so that as the speed of the shaft increases, the discharged stream or jet of fluid is displaced progressively further from the axis of the shaft. Means responsive to such displacement of the fluid stream controls the rate of flow of fuel to the engine to thereby obtain the desired speed regulation. Preferably these means include a piston which is held in a given position, at least in part, by the force of the fluid stream when it is directed along the axis of the turbine driven shaft. Means are provided for displacing this piston as rotation of the unbalanced spring member increases to deflect the fluid stream outwardly. Displacement of the piston in turn opens bypass means which reduce the flow of fuel to the combustor.

Alternately, the fluid jet may be discharged from such an unbalanced rotating tube along a path which is initially essentially parallel to but offset from the axis of rotation. The weight unbalance of the tube may be to the opposite side of the axis of rotation so that as the rate of rotation of the tube increases the fluid jet is displaced from an essentially annular path towards an axial path. Means responsive to such displacement of the fluid jet towards an axial path may then be employed to actuate means to limit engine speed.

Another alternative in accordance wtih other features of the invention is to provide a cantilever mounted tube projecting axially from the end of a shaft rotating in accordance with engine speed. Such tube is nominally disposed concentrically of the axis of rotation and has a receiver orifice facing outwardly of its free end, with means being provided for discharging a fluid jet towards said receiver orifice along said axis of rotation to thereby create a recovered pressure in said tube. The cantilevered tube likewise has an unbalanced weight causing the free end thereof to be displaced from an axial to a conical path as the rate of rotation of the shaft increases, thereby decreasing the recovered pressure created by said fluid jet, and means responsive to variations in recovered pressure may be employed to actuate control means for limiting the speed of the engine.

The above and other related objects and features of the invention will be apparent from a reading of the following description of the disclosure found in the accompanying drawing and the novelty thereof pointed out in the appended claims.

In the drawings:
FIG. 1 is a longitudinal section of a governor mechanism embodying the present invention with the cooperating elements for controlling operation of a turbojet engine shown in abbreviated diagrammatic fashion;
FIG. 2 is an enlarged view, partly in section, of a jet tube and nozzle seen in FIG. 1;
FIG. 3 is a view taken on line III—III in FIG. 2;
FIG. 4 is a fragmentary view of a bypass port found in the governor mechanism.
FIG. 5 is a fragmentary longitudinal section of an alternate embodiment;
FIG. 6 is an enlarged view of a jet tube seen in FIG. 5;
FIG. 7 is a view taken on line VII—VII in FIG. 6; and
FIG. 8 is a fragmentary longitudinal section of another alternate embodiment of the invention.

FIG. 1 diagrammatically illustrates those portions of a speed control system for a turbojet engine 10 which are pertinent to the present invention. Thus fuel flows from a tank 12 to a pump 14 which discharges it under pressure to a main fuel control unit 16 of the type disclosed in U.S. Patent No. 3,084,510, issued April 9, 1963 on "Turbine Engine Fuel Control," and assigned to the assignee of the present invention. For present purposes it is sufficient to note that the unit 16, usually controlled by the pilot, comprises valve means for regulating the rate of flow of pressurized fluid to the engine 10. Thus fuel flows through conduit 18 to a nozzle 20 where it is ignited in the combustor 22 of the engine 10.

In accordance with the present invention, a governor indicated generally by reference character 26 controls flow of fuel through a bypass conduit 28 in order to prevent operation of the engine 10 at excessive speeds. When an excess speed condition exists, fuel flows through the bypass conduit 28 and is returned to the intake side of pump 14 through conduit 30 to reduce fuel flow through conduit 18. This means of control may be independent or complementary to other means for regulating the engine when operating at 100% speed.

The governor 26 comprises a first housing 32 which is secured to an engine frame member 34 by bolts 36. A shaft 38 is journaled within the housing 32 and is connected by a flexible coupling 40 to a shaft 42 driven from and in direct ratio to the turbine shaft of the turbojet engine 10. A jet tube 44 is secured to the opposite end of the shaft 38 which also continues as a sleeve 46 concentric of the tube 44 and spaced therefrom. The sleeve 46 is journaled by ball bearings 48. The ball bearings 48 are received in a bore 50 formed in the housing 32. The outer bearing 48 is positioned axially between a snap ring 52 and a shoulder on the sleeve 46, with the inner bearing 48 being spaced therefrom by spacer 54. The bearing assembly and the shaft 38 are positioned axially of the housing 32 by a snap ring 56 which retains the bearing assembly in the bore 50.

Means are provided for discharging fluid (specifically fuel) from the free end of the jet tube 44. This fuel enters a port 58 in the housing 32, passes through a passageway 60 to an annular chamber surrounding shaft 38. A transverse hole 62 in the shaft 38 connects with an axial hole 66 opening into the jet tube 44. Fuel flowing through the described passageways is discharged from the outer end of the jet tube 44 through a nozzle orifice 68 in a flyweight 70, secured to the free end of the jet tube.

At this point it will be noted that a second port 72 in the housing 32 is connected to an annular chamber 74 surrounding shaft 38, and that seals 76 are provided on opposite sides of this chamber. This is a precautionary feature in the event that oil seeps along the shaft from the housing for the engine shaft 42 or fuel seeps from the passageway 60, either may be disposed of through the port 72 and an appropriate conduit (not shown) to an overboard drain.

The function of the fuel jet discharged from the orifice 68 is to control movement of a piston 78 which in turn controls flow of fuel through the bypass conduit 28. The piston 78 is slidable in a flanged sleeve 80 that is secured to a second housing 82 by screws 84. These screws also hold an end cap 86 having a port 88. The casing 82 is secured to the casing 32 by screws 90 and forms in combination therewith a chamber 92 in which the outer end of the jet tube 44 rotates.

The piston 78 is normally held in its illustrated position by the recovered pressure of the fuel jet from orifice 68 into receiver orifice 98 and by a compression spring 94 disposed in a closed chamber 95 between the left hand of piston 78 and a plug 96. In normal operation the chamber 95 completely fills (or substantially so) with fuel without requiring any special bleeding means. This plug has an orifice 98 therethrough which is normally aligned with the nozzle orifice 68 in the flyweight 70.

The bypass conduit 28 is connected to a port 100 in the housing 82 so that fuel may flow to an annular chamber 102 surrounding the sleeve 80 and defined at its opposite ends by seals 104. Fuel may then flow through ports 106 to a chamber 108 defined by a reduced diameter intermediate the length of piston 78. Upon leftward displacement of the piston 78, fuel may flow through ports 110 to a second annular chamber 112 surrounding the sleeve 80 and defined by a seal 114 and one of the seals 104. The fuel is then free to pass to the return conduit 30 which is connected to port 116.

Reverting again to the means for controlling displacement of the piston 78, it was previously pointed out that this piston was normally maintained in its illustrated position by the combined effect of the fuel jet from orifice 68 and spring 94. These forces are opposed by a fluid force on the opposite end of the piston 78. Both of the fluid forces are advantageously derived by tapping pressurized fuel from the main control 16. Thus conduit 118 extending therefrom is connected to both of the ports 58 and 88.

In operation, a jet of fuel is continuously discharged from the orifice 68, filling the spring chamber 95 and also substantially filling chamber 92. Since the fuel jet passes through a liquid medium, it is preferable that the nozzle orifice 68 be closely adjacent the receiver orifice 98 so as to maintain a substantial fluid pressure in the chamber 95 and on the left end of piston 78. On the other hand, it is desirable to prevent any substantial liquid pressure from building up in the chamber 92 and therefore a passageway 120 is formed in housing 82 which connects with port 116 so that fuel may flow freely to the return conduit 30. The force of the spring 94 is less than the fluid force on the right end of the piston 78, which in turn is less than the combined force of the recovered pressure from the nozzle orifice 68 and the force of spring 94. Thus, when operating below 100% speed, the fuel jet is effective to maintain the piston 78 in a position preventing flow of fuel through the bypass conduit 28.

Upon approaching or exceeding 100% speed, the fuel jet is deflected from its normal position on the axis of shaft 38 to a conical path progressively away from the receiver orifice entrance 98 to chamber 95 thereby reducing the force on the left end of the piston 78 and allowing it to be displaced to the left as the force of the fuel pressure on the right end thereof overcomes the action of spring 94. Upon such displacement of the piston 78, ports 110 are opened to permit flow of fuel through the bypass conduit 28. This in turn will reduce the amount of fuel passing to the engine combustor 22 and cause a reduction in engine speed. While the present governor may be used as the sole means for controlling operation at 100% speed, it is to be expected that other known control means will reduce delivery of fuel from the main control to the conduit 18 to that required for 100% speed. As this occurs, the fuel jet from nozzle 68 will again be effective to return the piston 78 to its illustrated position preventing fuel flow through the bypass conduit 28.

The above very briefly describes the operation of the present governor. However, it is to be noted that certain critical relationships exist in the means for obtaining controlled deflection of the jet tube 44. As has been indicated above, this deflection is obtained by a weight unbalance so that centrifugal force will actually cause tube deflection.

The weight unbalance referred to advantageously is determined by the distance of the center of gravity C.G. of the flyweight 70 from the axis of tube 44. This offset is indicated in FIG. 3 but greatly exaggerated. This offset is extremely small and may be obtained by the simple expedient of drilling an accurately sized hole 122 (FIG. 3) in the outer diameter of the flyweight 70. The flyweight is otherwise balanced and carefully assembled on the jet tube 44. The tube 44 is inserted into a close fitting socket in the flyweight 70 and held in place by brazing which is introduced through a cross hole 124.

The flyweight 70 may thus be considered as an integral part of the tube 44.

Obviously as the jet tube 44 increases its rate of rotation up to 100% speed some deflection of the tube will occur and the jet stream from nozzle orifice 68 will be displaced to a conical path of movement. It is desirable up to 100% speed that the conical path of movement of this fluid jet at the entrance to the receiver orifice 98 not exceed the diameter of the receiver orifice so that the recovered jet pressure on the piston 78 will remain constant up to 100% speed.

Another factor of importance is that effective recovered pressure drops off sharply if the receiver orifice 98 is substantially more than twice the diameter of the discharge orifice 68. Preferably the receiver orifice (98) diameter should be between 1.5 and 2 times the nozzle orifice (68) diameter. Since the two orifices are closely spaced, the permissible deflection of the jet tube (at the outlet of orifice 68) may be considered to be the difference in radii of these two orifices.

As has been previously indicated, it is desired that deflection of the tube 44, or more precisely the fuel jet therefrom, occur over a relatively narrow and sharply defined speed range. Further it is essential that in this narrow speed range such deflection be controlled and progressive as opposed to instantaneous deflection which occurs when critical speed is exceeded.

The maximum deflection range of jet tube 44 during which a variation in recovered pressure on piston 78 could occur would have as its lower limit the deflection wherein the outer diameter of the conical path of the fluid jet equalled the diameter of the receiver orifice 98 and as its upper limit the deflection wherein the inner diameter of the annular path of conical movement equalled the diameter of the receiver orifice 98. The range of tube deflection in which a variation in recovered pressure controls movement of the piston 78 may be reduced by selecting a spring 54 which permits piston 78 to be fully displaced when less than maximum recovered pressure has been dissipated by deflection of the fluid jet toward an annular path.

In any event a deflection range for the jet tube 44 may be established within the described parameters to the end that movement of the piston 78 is controlled to vary the amount of fuel bypassed to limit engine speed. This deflection range of the tube 44 may be referred to as its control deflection range.

The tube 44 functions as a cantilevered spring member when it is deflected by the centrifugal force of the unbalanced mass (at C.G.) of the flyweight 70. As such, the tube 44 has a determinable "spring" rate which is a function of its physical dimensions and the material from which it is made.

The flyweight 70 provides a given mass tending to deflect the tube. This deflecting force is a function of the square of the rate of rotation. These parameters establish "weight" rate which may be expressed as:

$$M\omega^2$$

wherein:

$M$ = the mass of the deflecting force and
$\omega$ = the rate of rotation (expressed in radians)

It has been found that by establishing the following relationship $$\frac{\text{spring rate}}{\text{weight rate}} = \frac{1.25 \text{ to } 1.1 \text{ (at 100\% speed)}}{1}$$

that the desired progressive control of piston 78 may be obtained over a relatively narrow speed range without exceeding critical speed through the "control deflection" range of the jet tube 44 where other parameters such as orifice sizes spring and fluid pressures are properly selected as herein taught.

Movement of tube 44 through its control deflection range results in progressive outward deflection of the fuel jet discharged therefrom, causing the fuel jet to progressively impinge the marginal surface portions of plug 96 which define receiver orifice 98, thereby reducing the recovered pressure on the left end of piston 78. The constant force on the opposite end of this piston displaces it to the left, progressively opening the ports 110.

It will be noted that the ports 110 (FIG. 4) are triangular shaped and disposed so that the amount of fuel bypassed therethrough increases at a progressively increasing rate as the piston moves in controlled fashion toward the left. With this arrangement, smooth and accurate regulation of engine speed may be obtained.

It is usual to expect that the bypassing of fuel will limit engine speed so that the tube 44 will not rotate in excess of critical speed or at a speed which would permanently stress the tube. To further insure against such possibility, the sleeve 46 provides a positive stop limiting deflection of the tube to a point within its elastic limit for reasonably expected rates of rotation.

While the present invention is not limited to any size restrictions it provides a notable advantage in reducing the bulk and weight of governor mechanisms employed with aircraft engines. Strictly for the sake of illustration the jet tube may have a length of about four inches, the flyweight will weigh less than two tenths of a pound, and the offset of the center of gravity C.G. can be in the order of .002 inch.

It would be pointed out that the present governor has the further advantage that its design for any given control system may be calculated from known formulas with remarkable accuracy to obtain desired speed control with little or no adjustment or experimentation.

It will be apparent that 100% speed is an arbitrarily selected value. In jet engines of the type herein contemplated, this speed would be in the order of several thousand revolutions per minute and have a definite relationship to the upper limit at which the engine should operate. However, other speeds and points of reference can likewise be established in obtaining progressive speed control over a narrow range above whatever is established as 100% speed.

The present invention is generic to more than one particular embodiment as will be apparent by reference to the remaining figures in the drawings.

The embodiment of FIG. 5 may employ identical mechanism as previously described to mount and rotate the jet tube 44 and deliver pressurized fuel thereto. This governor also comprises a second casing 82' which corresponds to the casing 82 and provides passageway means for the flow of bypassed fuel from conduit 28 to conduit 30. Many of the components in casing 82' may be identical with corresponding components in the previous embodiment or simply relocated without any change in function. Such components are identified by like reference characters in FIG. 5, without necessarily being described or referred to. Other components correspond to those of the previous embodiment but have been modified and are identified by like reference characters primed in FIG. 5.

Bypass fuel flow is again directly controlled by piston 78 which is slidable in sleeve 80', the latter being held in place by the screws for end cap 86. The casing 82' likewise forms in part a chamber 92 in which the jet tube 44 rotates.

The bypass conduit 28 is connected to port 100 which is relocated so that fuel may flow into annular chamber 102 now at the left hand end of sleeve 80'. Fuel may then flow through ports 106 into a chamber 108 defined by the reduced diameter of piston 78. Upon rightward displacement of piston 78 fuel may flow through ports 110 to a second annular chamber 112 surrounding sleeve 80'. The fuel is then free to flow to the return conduit 30 which is connected to port 116.

The piston 78 is normally maintained in its illustrated position against a flange 129 on sleeve 80' by a spring 130 disposed in a chamber 132 at the right hand end of the piston 78. The end cap 86 is connected to the return conduit 30 to prevent any pressure buildup in the chamber 132 should fuel leak therein.

Reference will now be made to the enlarged showings in FIGS. 6 and 7 illustrating the modified flyweight 70'. It will be seen that the discharge orifice 68' is offset from the axis of the tube 44. The offset of orifice 68' is such that the fluid jet travels in an annular path completely outside the receiver orifice 98 at all speeds below 100% speed.

As before, the center of gravity C.G. of the flyweight 70' is unbalanced and displaced from the axis of the tube 44 as indicated in FIG. 7. This desired unbalance can again be created by the simple expedient of drilling a hole 122 in the flyweight. It will be noted that the discharge orifice 68' is displaced to one side of the axis of tube 44 and the center of gravity to the other and preferably they are diametrically aligned.

As the rate of rotation of tube 44 is progressively increased the tube deflects bringing the nozzle orifice 68 toward alignment with the receiver orifice 98. The fuel jet thus is progressively displaced toward the receiver orifice 98 to create an increasing recovered pressure in the chamber 95' at the left end of piston 78. The recovered pressure of the fuel jet displaces the piston 78 toward the right against the action of spring 130. As the piston 78 is thus displaced fuel flows through ports 110 at a progressively increasing rate to bypass fuel through conduit 28 and thus limit engine speed to a desired maximum. The ports 110 may again be triangular and disposed to bypass fuel at a progressively increasing rate as the piston 78 is displaced.

The spring rate of tube 44 and the weight rate provided by the unbalanced mass of flyweight 70' may be determined in the fashion previously described so that the tube 44 will be deflected through a control range from 100% speed to say 106% wherein the recovered pressure will increase from zero to maximum and the piston 78 displaced thereby to bypass fuel in this speed range and thus limit the engine speed. It will be apparent that the orifices 68' and 98' may be the same size since deflection of the tube 44 below 100% speed simply brings the orifice 68' into alignment with the orifice 98'.

In the embodiment of FIG. 8 the two main casings 32" and 82" have been extensively modified but the construction and manner of mounting the jet tube 44 is the same as in FIG. 1, and reference is made thereto for a detailed description. In this embodiment the casing 82" is provided with a port 140 which is connected to the pressurized fuel conduit 118. Port 140 leads to a fixed discharge orifice 68" while the receiver orifice 98" is formed in the flyweight 70" being concentric with the axis of tube 44. The fuel jet is thus fixed and the receiver orifice provided at the free end of the rotating control element.

The casing 32" has been modified to mount the sleeve 80 and piston 78 and the elements associated therewith at the end of passageway 60 described in the previous embodiment. Thus, so long as the tube 44 rotates below 100% the fuel jet from nozzle orifice 68" will create a recovered pressure on the receiver orifice 98" which is transmitted along the length of the tube 44 through passageways 66 and 62 to create a static pressure in the chamber 95 at the lower end of the piston 78. This pressure in combination with the force of spring 94 at least balances the effective force on the opposite end of piston 78 which is connected to the pressure conduit 118 as before. Thus below 100% speed piston 78 blocks flow of fuel through the ports 110 so that no fuel is bypassed through conduit 28.

Above 100% the deflection of the tube 44 reduces the recovered pressure on the receiving orifice 98" in the same fashion as where the receiving orifice was stationed as described in connection with FIG. 1. The pressure in chamber 95 is thus progressively reduced permitting the piston 78 to be displaced so that fuel may flow through the ports 110 and thus be bypassed through conduit 28 to the return conduit 30. It will be seen that the porting for conduits 28, 30 has been translated in casing 32" so that they are side by side. Their function however remains unchanged.

Other modifications will occur to those skilled in the art and the scope of the convention is therefore to be derived solely from the following claims.

Having thus described the invention what is claimed as novel and desired to be secured by Letters Patent of the United States is:

1. An engine control device comprising a shaft rotating at a rate proportionate to engine speed, said shaft having a cantilever mounted tube projecting axially therefrom and nominally disposed concentrically of the axis of rotation, said tube having an orifice directed outwardly of its free end, a fixed orifice directed towards said tube, one of said orifices being a jet orifice and the other being a receiver orifice, means for directing a fluid jet from the jet orifice toward the receiver orifice, said tube having an unbalanced weight which causes its free end to deflect as its rate of rotation increases thereby varying the degree of impingement of the jet on the receiver orifice, and means responsive to changes in impingement of the jet on the receiver orifice for controlling the speed of the engine.

2. An engine control device comprising a shaft rotating at a rate proportionate to engine speed, said shaft having a cantilever mounted tube projecting axially therefrom, and nominally disposed concentrically of the axis of rotation, said tube having an orifice directed outwardly of its free end, a fixed orifice directed towards said tube, one of said orifices being a jet orifice and the other being a receiver orifice, means for directing a fluid jet from the jet orifice into the receiver orifice during a portion of the rotational speed range of the shaft, a chamber downstream of the receiver orifice, said jet creating a pressure in said chamber when it is directed into said receiver orifice, said tube having an unbalanced weight which causes its free end to deflect as the rate of rotation increases, thereby varying the recovered pressure created by said jet and in said chamber, and means responsive to variations in the recovered pressure of said fluid stream for controlling the speed of the engine.

3. An engine control device comprising a shaft rotating at a rate proportionate to engine speed, said shaft having a cantilever mounted tube projecting axially therefrom and nominally disposed concentrically of the axis of rotation, said tube having a relatively large mass at its free end, the center of gravity of said mass being displaced a small distance outwardly from the axis of said tube, whereby as said tube rotates at an increasing speed the tube deflects at an extremely slow rate up to a desired 100% speed condition and then deflects at a relatively high but yet progressive and controlled rate when the rotational rate is increased through a narrow speed range above 100% speed, said tube having an orifice directed outwardly of its free end, a fixed orifice directed towards said tube, one of said orifices being a jet orifice and the other being a receiver orifice, means for directing a fluid jet from the jet orifice toward the receiver orifice, the receiver orifice being of a size such that there is no substantial change in impingement of the fluid jet on the receiver orifice below 100% speed and variations in impingement occur above 100% speed through said narrow range, and means responsive to changes in impingement of the jet on the receiver orifice for controlling the speed of the engine.

4. An engine control device comprising a shaft rotating at a rate proportionate to engine speed, said shaft having a cantilever mounted tube projecting axially therefrom and nominally disposed concentrically of the axis of rotation, a flyweight mounted on the free end of said tube and having a relatively large mass the center of gravity of which is displaced a small distance outwardly from the axis of said tube, whereby as said tube rotates at an increasing speed the tube is deflected by the centrifugal force created by the offset mass of said flyweight, the deflecting force rate of said flyweight being expressed as a weight rate equal to the product of the flyweight mass times the square of the rate of rotation, said tube functioning as a cantilever spring having a predetermined spring rate, the ratio of spring rate to weight rate being between 1.25 and 1.1 to one at a desired 100% speed condition of said engine whereby deflection of said tube is relatively small at rotational rates below 100% speed and relatively rapid at a controlled rate through a narrow speed range above 100% speed, said flyweight having an orifice communicating with said tube and directed outwardly from the free end thereof, a fixed orifice directed towards said tube, one of said orifices being a jet orifice and the other being a receiver orifice, means for directing a fluid jet from the jet orifice toward the receiver orifice, the receiver orifice being of a size such that there is no substantial change in impingement of the fluid jet on the receiver orifice below 100% speed and variations in impingement occur above 100% speed through said narrow range, and means responsive to changes in impingement of the jet on the receiver orifice for controlling the speed of the engine.

5. An engine control device comprising a shaft rotating at a rate proportionate to the rate of engine speed, said shaft having an elongated cantilever mounted control element projecting from one end thereof and nominally disposed concentrically of the axis of rotation, said control element having a relatively large mass at its free end, the center of gravity of said mass being disposed a small distance outwardly from the axis of said control element whereby as said element rotates at an increasing speed the element deflects at an extremely slow rate up to a desired 100% speed condition and then deflects at a relatively high but yet progressive and controlled rate when the rotational rate is increased through a narrow speed range above 100% speed and means responsive to deflection of said control member at said relatively high and progressive rate through said narrow speed range for controlling the speed of the engine.

6. An engine control device as in claim 5 wherein a flyweight is mounted at the free end of said control element, said flyweight having a relatively large mass the center of gravity of which is displaced a small distance outwardly from the axis of said element, whereby as said element rotates at an increasing rate the element is deflected by the centrifugal force created by the offset mass of said flyweight, the deflecting force rate of said flyweight being expressed as a weight rate equal to the product of the flyweight mass times the square of the rate of rotation, said element functioning as a cantilevered spring having a predetermined spring rate, the ratio of spring rate to weight rate being between 1.25 and 1.1 to one at 100% speed.

7. An engine control device comprising a shaft rotating at a rate proportionate to engine speed, said shaft having a cantilever mounted jet tube projecting axially therefrom and nominally disposed concentrically of the axis of rotation, means for discharging a fluid jet outwardly from the free end of the jet tube along the axis thereof, said tube having an unbalanced weight causing the free end of the tube and the fluid jet discharged therefrom to be displaced from an axial to a conical path as the rate of rotation of said shaft increases, and means responsive to such displacement of said fluid jet for controlling the speed of the engine.

8. An engine control device comprising a shaft rotating at a rate proportionate to engine speed, speed control means for limiting engine speed, said shaft having a cantilever mounted jet tube projecting axially therefrom and nominally disposed concentrically of the axis of rotation, means for discharging a fluid jet outwardly from the free end of the jet tube along the axis thereof, said tube having an unbalanced weight causing the free end of the tube and the fluid jet discharged therefrom to be displaced from an axial to a conical path as the rate of rotation of said shaft increases, said speed control means further including a piston movable between a first position preventing operation of the limiting means towards a second position fully actuating said limiting means, said piston being maintained in said first position by the force of the fluid jet and means displacing the said piston towards its second position in response to displacement of the fluid jet towards its conical path to thereby limit engine speed.

9. In combination with a turbojet engine having combustor, means for pressurizing fuel, means for delivering the pressurized fuel to said combustor and bypass conduit for diverting fuel intended for delivery to said combustor to thereby limit engine speed, governor mechanism for controlling the flow of fuel through said bypass conduit and comprising a piston movable from a first position preventing fuel flow through said bypass conduit towards an open position permitting such flow, a shaft rotating at a rate proportionate to the rate of rotation of the engine turbine, a cantilever mounted jet tube projecting axially from said shaft and disposed concentrically of its axis of rotation, means for discharging a fluid jet outwardly from the free end of said jet tube along the axis thereof, said piston being maintained in its first position by the force of said fluid jet, said tube having a weight unbalance causing the fluid jet discharged therefrom to be displaced from its axial path towards a conical path as the rate of rotation of said shaft increases, and means displacing said piston from its first position towards its open position in response to such displacement of the fluid jet towards a conical path thereby permitting flow of fuel through said bypass conduit to thus limit engine speed.

10. In combination with a turbojet engine having a combustor, means for pressurizing fuel, means for delivering the pressurized fuel to said combustor and a bypass conduit for diverting fuel intended for delivery to said combustor to thereby limit engine speed, governor mechanism for controlling the flow of fuel through said bypass conduit, said governor mechanism comprising a piston movable between a closed position preventing fuel flow through said bypass conduit towards an open position permitting such flow, a shaft rotating at a rate proportionate to the rate of rotation of the engine turbine, a cantilever mounted jet tube projecting axially from said shaft and disposed concentrically of its axis of rotation, means connecting the inner end of said jet tube to the means for pressurizing fuel whereby a jet of fuel is discharged outwardly from the free end of said jet tube along a path axially thereof, a flyweight secured to the outer end of said jet tube, said jet tube being aligned with one end of said piston, a receiver orifice aligned with said axis of rotation and defining the entrance to a chamber at the near end of said piston, so that the recovered pressure of the fuel jet on said receiver orifice tends to maintain the piston in its closed position, a spring effective on said piston and providing a force which in combination with said fuel jet maintains said piston in its closed position, and means connecting the other end of said piston to said fuel pressurizing means and providing a force greater than said spring force and less than the combined force of said spring force and said fuel jet, tending to displace said piston to its open position, said jet tube having a weight unbalance at its outer end causing the fuel jet discharged therefrom to be displaced from its axial path to a conical path as the rate of rotation of said shaft increases, thus reducing the recovered pressure on the receiver orifice permitting the piston to be displaced towards its open position thereby limiting engine speed.

11. A combination as in claim 10 wherein the cantilevered tube has a predetermined spring rate and the force tending to deflect the tube is the weight rate expressed as the product of the flyweight mass times the square of the rate of rotation and at a given 100% engine speed the ratio of spring rate to weight rate is between 1.25 and 1.1 to one and further wherein the receiver orifice diameter is between 1.5 and 2 times the jet orifice diameter.

12. An engine control device comprising a shaft rotating at a rate proportionate to engine speed, said shaft having a cantilever mounted tube projecting axially therefrom and nominally disposed concentrically of the axis of rotation, and having a receiver orifice facing outwardly of the free end thereof, means for discharging a fluid jet towards said receiver orifice along said axis of rotation to thereby create a recovered pressure in said tube, said cantilevered tube having an unbalanced weight causing the free end thereof to be displaced from an axial to a conical path as the rate of rotation of said shaft increases, thereby decreasing the recovered pressure created by said fluid jet, means responsive to a reduction in recovered pressure for controlling the speed of said engine.

13. An engine control device as in claim 12 wherein the means for controlling the speed of the engine comprises a conduit for bypassing fuel intended for delivery to the engine and a piston movable from a first position preventing flow of fuel through the bypass conduit towards a position permitting such flow, said piston being offset from and movable towards and from said shaft, and passageway means connecting the interior of said tube with a chamber at one end of said piston, said piston being maintained in said first position at least in part by the recovered pressure from said fluid jet as transmitted through said tube and movable to a position permitting fuel flow through bypass conduit in response to a reduction in recovered pressure as the tube is deflected at increasing rates of rotation.

14. An engine control device as in claim 13 wherein the cantilevered tube has a predetermined spring rate and further wherein a flyweight having a relatively large mass is mounted on the free end thereof, the flyweight being unbalanced so that its mass provides the force tending to deflect the tube, which force rate is termed the weight rate and expressed as the product of the flyweight mass times the square of the rate of rotation, the ratio of spring rate to weight rate being between 1.25 and 1.1 to one at a desired 100% speed of said engine, whereby there will be a minimum of tube deflection below 100% speed and deflection of the tube above 100% speed will occur at a rapid but controlled rate over a narrow speed range as the recovered pressure of the fluid jet is progressively reduced.

15. An engine control device comprising a shaft rotating at a rate proportionate to engine speed, said shaft having a cantilever mounted jet tube projecting axially therefrom, and nominally disposed concentrically of the axis of rotation, means for discharging a fluid jet outwardly from the free end of the jet tube along a path substantially parallel to and spaced therefrom, said tube having an unbalanced weight disposed in offset relation from the path of the fluid jet on the opposite side of said axis of rotation, whereby the fluid jet discharged from the tube is displaced from annular path to a substantially axial path as the rate of rotation of said shaft increases, and means responsive to such displacement of said fluid jet for controlling the speed of said engine.

16. An engine control device as in claim 15, wherein the means for controlling the speed of said engine comprises a piston movable between a first position wherein the speed of the engine is unaffected towards a second position wherein the speed of the engine is limited, yieldable means normally maintaining said piston in said first position, a receiver orifice aligned with said tube at the free end thereof and concentric with said axis of rotation, said receiver orifice defining the entrance to a chamber at the near end of said piston, said piston being displaceable towards its second position in response to increased pressure within said chamber, such increased pressure and resultant speed control being produced by deflection of said tube causing the fluid jet to be displaced towards an axial path impinging into said orifice.

17. An engine control device as in claim 16 wherein the cantilevered tube has a predetermined spring rate and further wherein a flyweight having a relatively large mass is mounted on the free end thereof, the flyweight being unbalanced so that its unbalanced mass provides the centrifugal force tending to deflect the tube, which force rate is termed the weight rate nad expressed as the product of the flyweight mass times the square of the rate of rotation, the ratio of spring rate to weight rate being between 1.25 and 1.1 to one at 100% engine speed whereby there will be a minimum of tube deflection below 100% speed and deflection of the tube above 100% speed will occur at a rapid but controlled rate over a narrow speed range as deflection of the tube progressively increases the recovered pressure of the fluid jet in said chamber.

References Cited by the Examiner

UNITED STATES PATENTS

| | | | |
|---|---|---|---|
| 2,333,044 | 10/1943 | Rosch | 137—34 X |
| 2,779,582 | 1/1957 | Hopper et al. | 137—34 |
| 2,986,126 | 5/1961 | Werts | 137—34 X |
| 3,171,420 | 3/1965 | Cowles et al. | 137—34 X |

FREDERICK L. MATTESON, Jr., *Primary Examiner.*

R. A. DUA, *Assistant Examiner.*